(12) United States Patent
Harada

(10) Patent No.: US 8,084,975 B2
(45) Date of Patent: Dec. 27, 2011

(54) BRUSHLESS MOTOR, BRUSHLESS MOTOR CONTROL SYSTEM, AND BRUSHLESS MOTOR CONTROL METHOD

(75) Inventor: Tomomi Harada, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 325 days.

(21) Appl. No.: 12/593,845

(22) PCT Filed: Mar. 28, 2008

(86) PCT No.: PCT/JP2008/056157
§ 371 (c)(1),
(2), (4) Date: Sep. 29, 2009

(87) PCT Pub. No.: WO2008/120737
PCT Pub. Date: Oct. 9, 2008

(65) Prior Publication Data
US 2010/0109589 A1    May 6, 2010

(30) Foreign Application Priority Data
Mar. 30, 2007    (JP) ................ 2007-095450

(51) Int. Cl.
H02P 6/18    (2006.01)
(52) U.S. Cl. ......... 318/400.33; 318/400.04; 318/400.11; 318/430
(58) Field of Classification Search ............ 318/400.04, 318/400.11, 400.33, 254, 430, 432
See application file for complete search history.

(56) References Cited

U.S. PATENT DOCUMENTS
5,191,270 A * 3/1993 McCormack ............ 318/400.11
(Continued)

FOREIGN PATENT DOCUMENTS
JP    3-212146    9/1991
(Continued)

OTHER PUBLICATIONS

Notice of Allowance and English translation in JP 2009-507529 mailed Jul. 19, 2011.
(Continued)

Primary Examiner — Paul Ip
(74) Attorney, Agent, or Firm — Nixon & Vanderhye P.C.

(57) ABSTRACT

A brushless motor control system according to the present invention detects a rotor stop position when activating the brushless motor including a stator having coils of three phases U, V, and W, and controls a phase voltage for energizing the coils of the respective phases U, V, and W, and the brushless motor includes the stator having coils of phases U, V, and W of N (N≧2) poles, in which any one phase coil among the coils of the phases U, V, and W is removed in one of the N poles, and the brushless motor control system includes: a current rise detecting circuit that, when the brushless motor is in a stop state, sequentially selects coils of two phases from the coils of the respective phases U, V, and W, applies a predetermined direct current voltage between the selected coils of the two phases, and detects a value of an electric current flowing to the selected coils of the two phases; and a rotor stop position detecting unit that determines a rotor stop position of the brushless motor based on information of the value of the electric current flowing to the respective phase coils which is detected by the current rise detecting circuit.

4 Claims, 15 Drawing Sheets

U.S. PATENT DOCUMENTS

| | | | |
|---|---|---|---|
| 5,857,349 A * | 1/1999 | Hamaoka et al. | 62/228.4 |
| 5,970,733 A * | 10/1999 | Hamaoka et al. | 62/228.4 |
| 6,014,004 A * | 1/2000 | Hamaoka et al. | 318/778 |
| 6,344,721 B2 | 2/2002 | Seki et al. | |
| 7,746,023 B2 * | 6/2010 | Ajima et al. | 318/700 |
| 2001/0050542 A1 | 12/2001 | Seki et al. | |
| 2005/0189892 A1* | 9/2005 | Kokami et al. | 318/254 |
| 2010/0045219 A1* | 2/2010 | Ajima et al. | 318/400.04 |
| 2010/0117572 A1* | 5/2010 | Harada et al. | 318/400.11 |
| 2011/0187303 A1* | 8/2011 | Lee et al. | 318/400.34 |

FOREIGN PATENT DOCUMENTS

| | | |
|---|---|---|
| JP | 07-274585 | 10/1995 |
| JP | 10-257792 | 9/1998 |
| JP | 2001-275387 | 10/2001 |
| JP | 2001-327185 | 11/2001 |
| JP | 2005-12952 | 1/2005 |
| JP | 3673964 | 5/2005 |
| JP | 2006-081396 | 3/2006 |

OTHER PUBLICATIONS

International Search Report for PCT/JP2008/056157, mailed May 27, 2008.

Shun-ichi Kondo, "Brushless Dc Motor Control Circuit Design", Transistor Technology, CQ Publishing Co. Ltd., pp. 212-220, Feb. 2000.

Satoshi Kusaka, "Brushless DC Motor Driving Method", Transistor Technology, CQ Publishing Co. Ltd., pp. 221-228, Feb. 2000.

* cited by examiner

| Rotor position | (P4) W phase electric current value | (P5) W phase electric current value |
|---|---|---|
| 1 (FIG. 5A) | (A) | B |
| 2 (FIG. 6A) | B | C |
| 3 (FIG. 7A) | C | D |
| 4 (FIG. 8A) | (D) | C |
| 5 (FIG. 9A) | C | B |
| 6 (FIG. 10A) | B | A |

BRUSHLESS MOTOR, BRUSHLESS MOTOR CONTROL SYSTEM, AND BRUSHLESS MOTOR CONTROL METHOD

This application is the U.S. national phase of International Application No. PCT/JP2008/056157, filed 28 Mar. 2009, the entire contents of which is hereby incorporated by reference.

TECHNICAL FIELD

The present invention relates to a brushless motor control system for driving a brushless motor (brushless DC motor) to be used as a motor for a starter of an internal combustion engine (engine). In particular, it relates to a brushless motor, a brushless motor control system, and a brushless motor control method which can reliably detect a rotor stop position when the motor is in a stop state, without using a rotor position detection sensor such as Hall element.

Priority is claimed on Japanese Patent Application No. 2007-95450, filed Mar. 30, 2007, the content of which is incorporated herein by reference.

BACKGROUND ART

In general, as a drive control method for a brushless motor used in a starter of an internal combustion engine, there is known a sensor type drive control circuit in which a plurality of Hall elements are implemented around a rotor, for detecting a position of the rotor (permanent magnet side) within the brushless motor. However, in this sensor type drive control circuit, a plurality of Hall elements need to be implemented and a position detection magnet or the like needs to be implemented separately from the rotor as necessary. Consequently, it has been an obstacle to reduction in size and reduction in cost. Moreover, a variation occurs in position detection accuracy due to the condition of the Hall element installation. Consequently, there has been a strong demand for realizing a sensorless type drive control circuit that detects a rotor position without the use of a sensor such as Hall element, and this has been realized at present.

In the conventional sensorless type drive control of a brushless motor, there is known a drive control method based on 120° conduction (a method in which electric power is conducted only during the 120° period of the entire 180° phase period) in which: a drive electric current is caused to flow to an armature coil at a high speed timing that does not cause the motor to rotate; then from the drive current rise characteristic thereof, a rotor stop position within the brushless motor is detected; a conduction start phase is then determined and the rotor is rotated; and having started conduction, a zero-cross point of the phase voltage of a non-conduction phase is detected, to thereby detect a rotor position. As other conduction method, there is the 180° conduction method in which a rotor position is obtained based on rotor position detection waveforms detected from a sub coil, and 180° conduction is performed to thereby perform drive control of a brushless motor (for example, refer to Patent documents 1, 2, 3, 4, and 5, and Non-patent documents 1 and 2).

The above detection of a rotor stop position when the motor is in the stop state is such that electric power is conducted to phases U, V, and W for a short period of time (for example, several msec), and the difference in rising electric current associated with the relationship between the position of (the magnet of) the rotor and the position of the motor coil, is taken to thereby detect a rotor stop position.

This rotor stop position detection method is such that where the L (inductance) values of coils of the respective phases U, V, and W wound respectively on multiple poles of a three phase motor are equal respectively in the phases U, V, and W, it utilizes the fact that a difference occurs in the magnetic field received on the coils of the respective phases according to the position of (the magnet of) the rotor, and consequently a difference occurs in the electric current rise when electric power is conducted to the coil of the same L value.

[Patent document 1] Specification of Japanese Patent No. 3673964
[Patent document 2] Japanese Unexamined Patent Application, First Publication No. 2006-81396
[Patent document 3] Japanese Unexamined Patent Application, First Publication No. H10-257792
[Patent document 4] Japanese Unexamined Patent Application, First Publication No. H07-274585
[Patent document 5] Japanese Unexamined Patent Application, First Publication No. 2001-327185
[Non-patent document 1] Shun-ichi Kondo, "Brushless DC Motor Control Circuit Design", Transistor Technology, CQ Publishing Co. Ltd., pp. 212-220, February, 2000
[Non-patent document 2] Satoshi Kusaka, "Brushless DC Motor Driving Method", Transistor Technology, CQ Publishing Co. Ltd., pp. 221-228, February, 2000

DISCLOSURE OF INVENTION

Problem to be Solved by the Invention

However, in the above rotor stop position detection method, there are the following problems.

As a first problem, there is an assumption that the L values of the respective coils of the three phases are equal because the difference in the rising electric current has to be associated with the influence of the magnetic field. However normally there is a variation in the actual motor coils, and the L values of the respective coils of the three phases are not the same values.

In particular, a motor of a generator of a motor cycle or a vehicle and the like, differs from a brushless motor for driving a floppy disk (registered trademark) or a hard disk, in that it requires a large power and consequently the L values of the three phases are respectively large. If the L values are large, the difference in L values associated with a variation in coils becomes more significant. Therefore, the difference that emerges in the rising electric current becomes dependent on the variation in the L values rather than on the influence of the magnetic field. Thus, when a difference occurs in the variation, the rotor position in a rotor stop state is falsely detected. For example, compared to the electric current that flows into the phase in which electric current is likely to flow due to the influence of the magnetic field, a greater electric current flows, due to the influence of the L values, into the phase in which the electric current is unlikely to flow due to the influence of the magnetic field.

As a second problem, there has been a problem in that power conduction is performed for a very short period of time that does not cause the rotor to move, and consequently the difference in the electric current becomes minute.

Thus, in the conventional rotor stop position detection method, the difference that emerges in the rising electric current of the coil may become dependent on the variation in the L values rather than on the influence of the magnetic field, and a rotor stop position in a rotor stop state may be falsely detected. Moreover since rotor stop position detection is performed by power conduction performed in a very short period of time that does not cause the rotor to move, there is also a case where a difference in the electric current becomes minute, so that it becomes difficult to accurately detect a rotor stop position.

The present invention has been conceived to solve the above problems. An object of the present invention is to provide a brushless motor, a brushless motor control system, and a brushless motor control method which can reliably detect a rotor stop position even when there is a variation in the inductance values of the driving coils of the multiple phases, without implementing a Hall element in the respective phases U, V, and W, or implementing a magnet or the like for position detection separately from the rotor, in the brushless motor.

Means for Solving the Problem

The present invention has been conceived to achieve the above object. A brushless motor according to the present invention is for a brushless motor control system that drives the brushless motor used as a starter motor of an engine, the motor control system detecting a rotor stop position when activating the brushless motor which includes a stator having coils of three phases U, V, and W, and controlling a phase voltage for energizing the coils of the respective phases U, V, and W, the brushless motor comprising the stator having coils of phases U, V, and W of N (N≧2) poles, and any one phase coil among the coils of the phases U, V, and W being removed in one of the N poles.

In the brushless motor having the above configuration, in the brushless motor with coils of the respective phases U, V, and W wound on multiple poles (a plurality of coils are wound in parallel), only a coil of any one phase from the coils U, V, and W on one pole among these is removed, and the L value of this phase is taken as an L value that clearly differs from that of the other two phases. Thus, when a direct current voltage is applied to the coils of the phases U, V, and W, and patterns of electric current flowing to the respective phase coils are detected, even if the variation in the L value of the respective phases is significant, the electric current difference clearly emerges due to the L value of the phase with less coils for one pole, and therefore the level of electric current associated with the variation in the L values will not be reversed.

Thus, while the electric current values of the respective phases cannot be compared as they are, the electric current difference of the electric current flowing to the respective phases due to the position of the rotor is clarified, and the position of the rotor can be precisely detected. Consequently, in the brushless motor, it is possible to reliably detect a rotor stop position when the motor is in the stop state, without implementing a Hall element in the respective phases U, V, and W, or implementing a magnet for position detection separately from the rotor. Moreover, it is possible to achieve a reduction in the number of components of the sensorless motor (brushless motor) while reducing the size and weight thereof.

A brushless motor control system according to the present invention drives a brushless motor used as a starter motor of an engine, the motor control system detecting a rotor stop position when activating the brushless motor which includes a stator having coils of three phases U, V, and W, and controlling a phase voltage for energizing the coils of the respective phases U, V, and W, and the brushless motor includes the stator having coils of phases U, V, and W of N (N≧2) poles, in which any one phase coil among the coils of the phases U, V, and W is removed in one of the N poles, and the brushless motor control system includes: a current rise detecting circuit that, when the brushless motor is in a stop state, sequentially selects coils of two phases from the coils of the respective phases U, V, and W, applies a predetermined direct current voltage between the selected coils of the two phases, and detects a value of an electric current flowing to the selected coils of the two phases; and a rotor stop position detecting unit that determines a rotor stop position of the brushless motor based on information of the value of the electric current flowing to the respective phase coils which is detected by the current rise detecting circuit.

The brushless motor control system having the above configuration uses a brushless motor with coils of the respective phases U, V, and W wound on multiple poles (a plurality of coils are wound in parallel), and the brushless motor is such that only a coil of any one phase from the coils of the phases U, V, and W on one pole among these is removed, and the L value of this phase is taken as an L value that clearly differs from that of the other two phases.

When the motor is in the stop state, a direct current voltage is sequentially applied between the coils of the two phases among the phases U, V, and W, and patterns of the electric current flowing to the coils of the respective phases (six patterns in total) are detected, to thereby determine a rotor stop position.

Thus, even if the variation in the L values of the coils of the respective phases U, V, and W of the brushless motor is significant, with the L value of the phase that is less for one pole, the difference in the electric current flowing to the respective coils can be made clearly different, and it is therefore possible to eliminate the phenomenon of the electric current level being reversed due to the variation in the L values.

Consequently, in the brushless motor, it is possible to reliably detect a rotor stop position when the motor is in the stop state, without implementing a Hall element in the respective phases U, V, and W, or implementing a magnet or the like for position detection separately from the rotor.

In the brushless motor control system according to the present invention, the brushless motor may include a four pole rotor including two pairs of an N pole and S pole; and the current rise detecting circuit may apply, at six predetermined timings from a first timing to a sixth timing, a predetermined direct current voltage between phases U and V, V and U, V and W, W and V, W and U, and U and W of the coils of the respective phases U, V, and W of the stator, in this order, and may detect an electric current pattern including a value of an electric current flowing to the coils of the respective phases at the respective timings from the first timing to the sixth timing; and the rotor stop position detecting unit may determine the rotor stop position by detecting a difference in the electric current pattern including the value of the electric current at the respective timings from the first timing to the sixth timing.

In the brushless motor control system of the above configuration, in the brushless motor provided with the four pole (two pairs of an N pole and S pole) rotor (brushless motor with a coil having being removed), a direct current voltage is applied between the coils of two phases among the coils of the respective phases U, V, and W on the stator side, and detects a rotor stop position based on, the current rising characteristic. In this case, electric current is caused to flow, at the six timings, between phases U and V, V and U, V and W, W and V, W and U, and U and W of the coils of the respective phases of U, V, and W, in this order. However, the electric current patterns are switched at a higher speed compared to the normal driving timing so as not to drive the motor. The difference in the electric current value patterns at these six timings is determined, and the rotor stop position is detected.

Thereby, in the brushless motor, it is possible to reliably detect a rotor stop position when the motor is in the stop state, without implementing a Hall element in the respective phases U, V, and W, or implementing a magnet or the like for position detection separately from the rotor.

In the brushless motor control system according to the present invention, the removal phase may be the V phase, and the rotor stop position detecting unit, when detecting a difference in the electric current patterns, may use: a value of a V phase electric current flowing to the coil of the V phase at the first to fourth timings; a value of a W phase electric current flowing to the coil of the W phase at the fifth timing; and a value of a U phase electric current flowing to the coil of the U phase at the sixth timing.

In the brushless motor control system of the above configuration, there is used the brushless motor with a coil of V phase having being removed, and when detecting a difference in the electric current patterns, the electric current value of the V phase electric current flowing to the V phase coil is used at the first to fourth timings, the value of the W phase electric current flowing to the W phase coil is used at the fifth timing, and the value of the U phase electric current flowing to the U phase coil is used at the sixth timing.

Thus, it is possible to reliably detect a rotor stop position when the motor is in the stop state.

A brushless motor control method according to the present invention is for a brushless motor control system that drives a brushless motor used as a starter motor of an engine, the motor control system detecting a rotor stop position when activating the brushless motor which includes a stator having coils of three phases U, V, and W, and controlling a phase voltage for energizing the coils of the respective phases U, V, and W, and the method includes: a step of using the brushless motor including the stator having coils of phases U, V, and W of N (N≧2) poles, in which any one phase coil among the coils of the phases U, V, and W is removed in one of the N poles; a current rise detection step of, when the brushless motor is in a stop state, sequentially selecting coils of two phases from the coils of the respective phases U, V, and W, applying a predetermined direct current voltage between the selected coils of the two phases, and detecting a value of an electric current flowing to the selected coils of the two phases; and a rotor stop position 10, detection step of determining a rotor stop position of the brushless motor based on information of the value of the electric current flowing to the respective phase coils detected in the current rise detection step.

The brushless motor control system including the above steps uses a brushless motor with coils of the respective phases U, V, and W wound on multiple poles (a plurality of coils are wound in parallel), and the brushless motor is such that only a coil of any one phase from the coils of the phases U, V, and W on one pole among these is removed, and the L value of this phase is taken as an L value that clearly differs from that of the other two phases.

When the motor is in the stop state, a direct current voltage is sequentially applied between the coils of the two phases among the phases U, V, and W, and the patterns of the electric current flowing to the coils of the respective phases (six patterns in total) are detected, to thereby determine a rotor stop position.

Thus, even if the variation in the L values of the coils of the respective phases U, V, and W of the brushless motor is significant, with the L value of the phase that is less for one pole, the difference in the electric current flowing to the respective coils can be made clearly different, and it is therefore possible to eliminate the phenomenon of the electric current level being reversed due to the variation in the L values.

Consequently, in the brushless motor, it is possible to reliably detect a rotor stop position when the motor is in a stop state, without implementing a Hall element in the respective phases U, V, and W, or implementing a magnet or the like for position detection separately from the rotor.

Effect of the Invention

According to the brushless motor control system of the present invention, in the brushless motor, it is possible to reliably detect a rotor stop position when the motor is in a stop state, without implementing a Hall element in the respective phases U, V, and W, or implementing a magnet or the like for position detection separately from the rotor. Therefore, it is possible to supply an inexpensive brushless motor control system. Moreover, the number of components of a sensorless motor (brushless motor) can be reduced while reducing the size and weight thereof.

REFERENCE SYMBOLS

Figure 1:
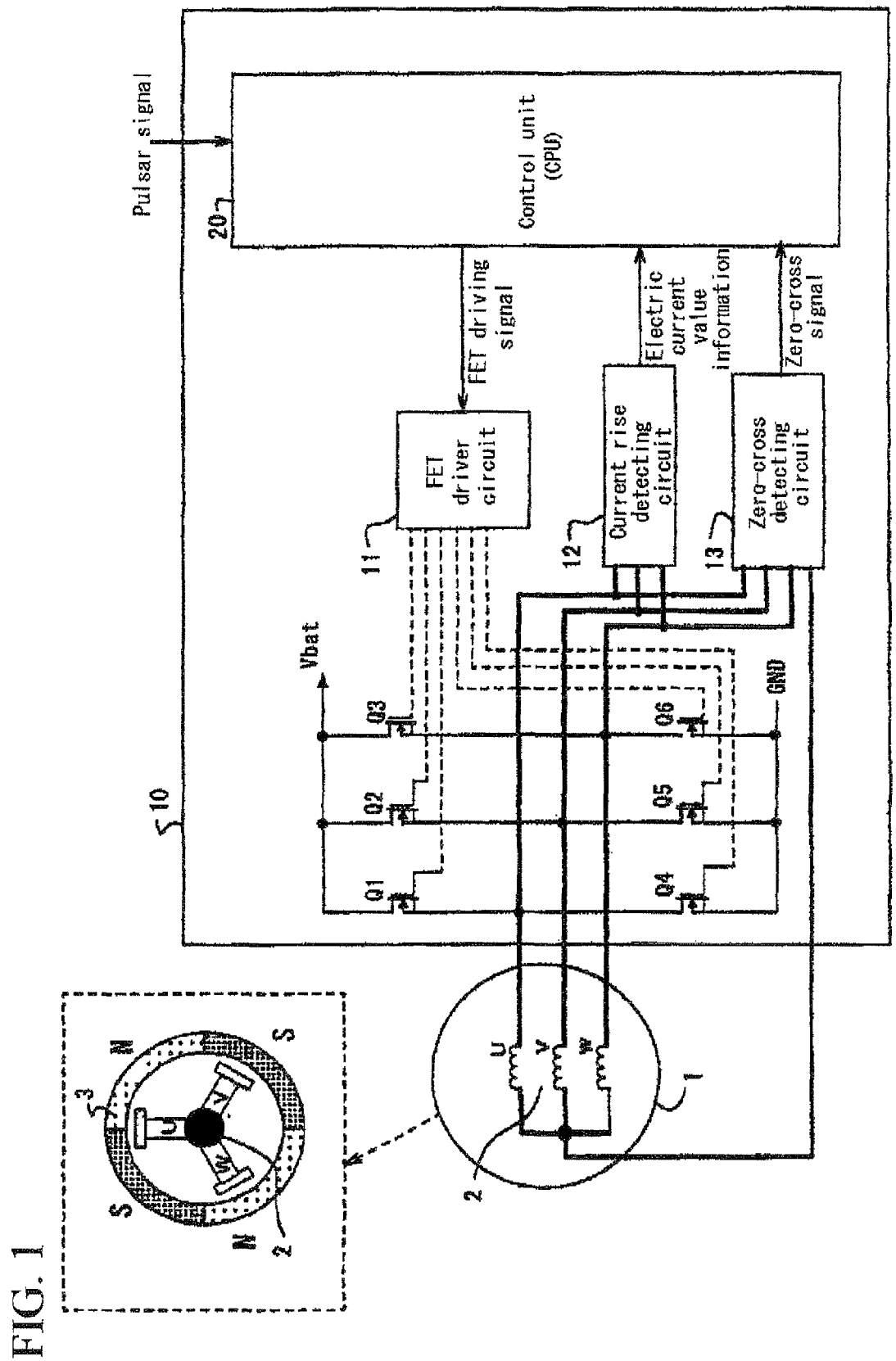
FIG. 1 shows a configuration of a brushless motor control system according to an embodiment of the present invention.

1 Brushless motor
2 Stator
3 Rotor
10 Brushless motor control system
11 FET driver circuit
12 Current rise detection circuit
Zero-cross detecting circuit
20 Control unit
21 Rotor stop position detecting unit
22 Rotor position detecting unit based on a zero-cross signal
23 Motor control unit

BEST MODE FOR CARRYING OUT THE INVENTION

Brief Overview

In the present invention, it is possible to reliably detect a rotor (permanent magnet side) stop position in a case where a brushless motor is in a stop state.

In a case where the brushless motor is in a stop state, a positive and negative direct current voltage are applied between two phase coils among the respective stator side coils of U, V, and W phases, to thereby detect a rotor stop position based on a current rise characteristic. In this case, an electric current is caused to flow to the coils of the respective phases U, V, and W at six timings. However, electric current patterns are switched at a higher speed compared to the normal driving timing so as not to cause the motor to rotate. From this drive current rise characteristic, the position of a rotor in the stop state is detected.

In general, a brushless motor used as a starter motor for an internal combustion engine is such that the coils of the respective phases U, V, and W are wound on multiple poles (a plurality of coils are wound in parallel). Any one coil of the U, V, and W coils on one pole among these is removed, and the L value of this phase is made an L value that is clearly smaller than that of the other two phases. Consequently, even if the variation in the L values of the respective phases is significant, the current difference clearly differs due to the L value of the phase that is less for one pole, and therefore the reversal phenomenon in the electric current level due to the variation in the L values is eliminated. Thus, while the electric current values of the respective phases cannot be compared as they axe, the electric current difference due to the position of the rotor is clarified, and the position of the rotor is precisely detected.

For example, in an example of a conventional brushless motor (a brushless motor with no coils to be removed), an experiment was carried out where the time of electric current conduction to the coils was 2.0 [msec]. In the experiment, the rotor moved, and there was a case in which accurate position detection could not be performed as a result. Moreover, when the current conduction time was made 1.0 [msec], the electric current difference was too small, making rotor position detection difficult to perform. However, in the case of a brushless motor used in the invention, while the difference in the electric current value was conventionally minute due to the very short power conduction time, the electric current difference showed up significantly due to the one phase having a different L value, and consequently it becomes possible to accurately detect the position of the rotor.

As described above, with the brushless motor and the brushless motor control system of the present invention, it is possible to reliably detect a rotor stop position when the motor is in a stop state, without, in the brushless motor, implementing a Hall element in the respective phases U, V, and W, or implementing a magnet or the like for position detection separately from the rotor. Therefore, it is possible to supply an inexpensive brushless motor control system. Moreover, the number of components of a sensorless motor (brushless motor) can be reduced while reducing the size and weight thereof.

Hereunder, an embodiment of the present invention is described, with reference to the drawings.

[Description of a Configuration of a Brushless Motor Control System According to the Present Invention]

FIG. 1 shows a configuration of a brushless motor control system according to an embodiment of the present invention. In FIG. 1, the brushless motor control system includes a brushless motor 1 and a brushless motor control device 10.

The brushless motor 1 is a motor for a starter of an internal combustion engine, and includes coils (coils wound on iron cores) of the respective phases U, V, and W, stator 2 having a neutral line of the coil, and a rotor 3 including permanent magnets of four poles (two pairs of N pole and S pole).

The brushless motor control device 10 is a control device that drives the three phase brushless motor 1. The brushless motor control device 10 has switching elements Q1 to Q6 configured with a three-phase bridge of a FET (field effect transistor), a FET driver circuit 11, a current rise detecting circuit 12, a zero-cross detecting circuit 13, and a control unit 20.

Figure 3A:
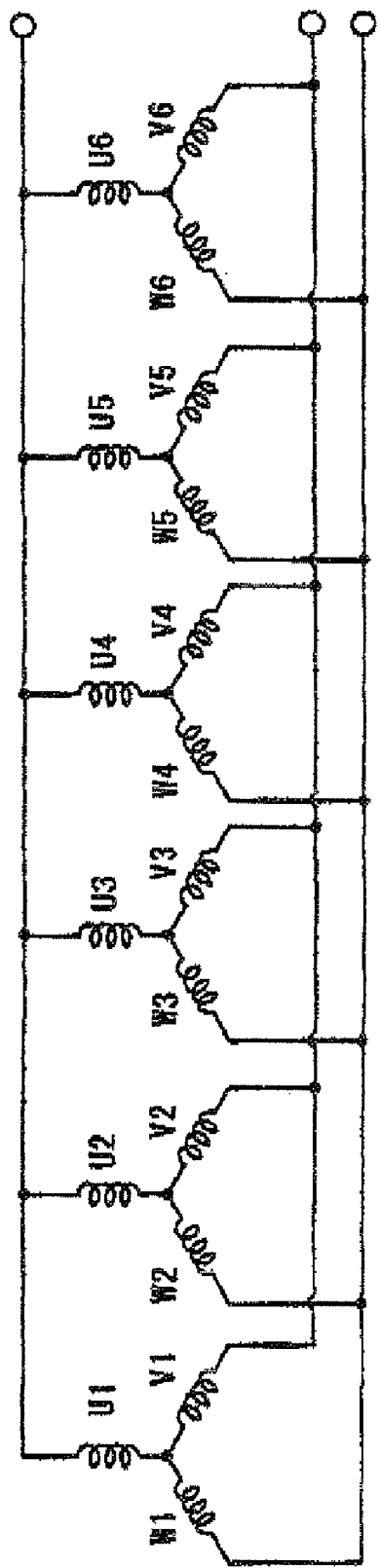
FIG. 3A shows a configuration of coil windings of phases U, V, and W of a brushless motor.
Figure 3B:
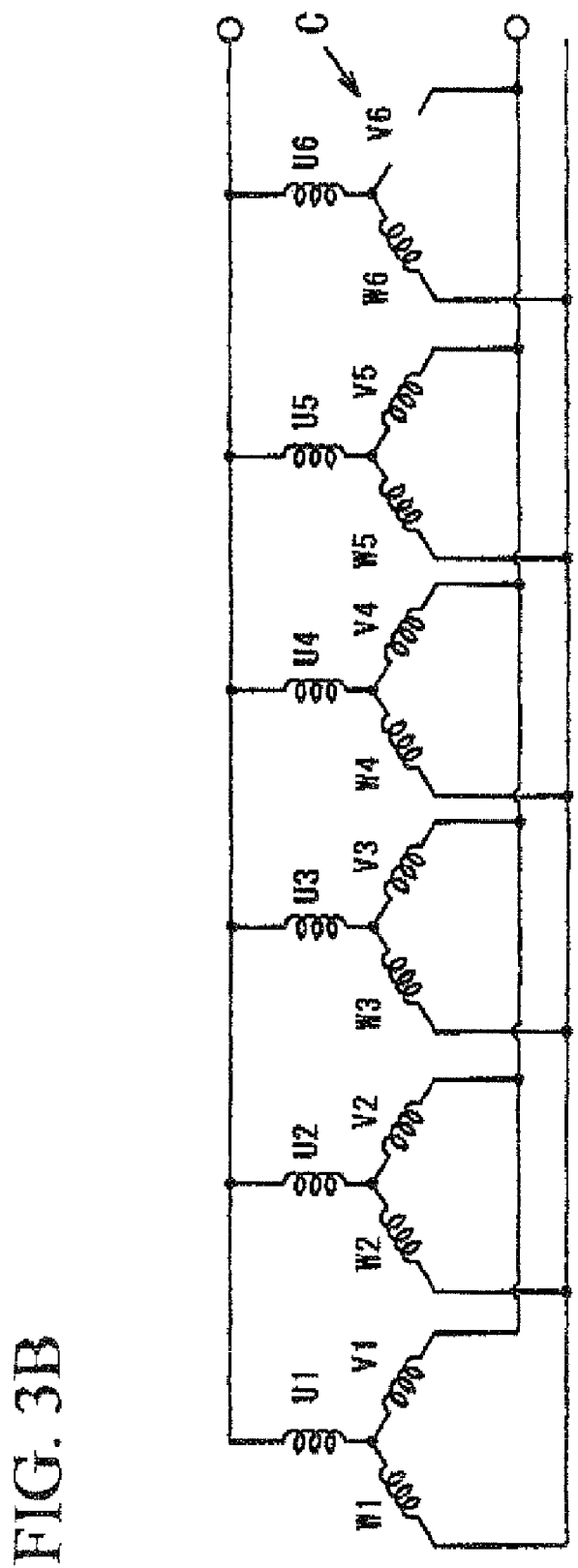
FIG. 3B shows a configuration of coil windings of phases U, V, and W of a brushless motor.

In the brushless motor 1, while the windings of the coils of the respective phases U, V, and W of the stator 2 are generally configured with windings of six poles (six layer windings of U1 to U6, V1 to V6, and W1 to W6) connected in parallel as shown in FIG. 3A, a V phase coil V6 (coil C to be removed) for one pole has been removed as shown in FIG. 3B. The coil to be removed may be an arbitrary one phase coil of any one pole. Moreover, the number of parallel poles of the winding is not limited to six, and may be as many as required.

Among the switching elements Q1 to Q6 configured with a three phase bridge, the switching element Q1 is connected between the positive side voltage Vbat of a battery serving as a direct current power supply (not shown in the drawing) and the U phase coil of the brushless motor 1, the switching element Q2 is connected between the positive side voltage Vbat of the battery and the V phase coil, and the switching element Q3 is connected between the positive side voltage Vbat of the battery and the W phase coil.

The switching element Q4 is connected between the U phase coil of the brushless motor 1 and the GND of the battery, the switching element Q5 is connected between the V phase coil and the GND of the battery, and the switching element Q6 is connected between the W phase coil and the GND of the battery.

The above switching elements Q1 to Q6 are driven by a gate driving signal output from the FET driver circuit 11. This gate signal is generated in the FET driver circuit 11 based on a FET driving signal output from the control unit (control unit configured with a CPU or the like) 20.

The current rise detecting circuit 12 is a circuit that detects an electric current signal for detecting a rotor stop position in a case where the brushless motor 1 is in a stop state, and information of the detected electric current value is transmitted to the control unit 20.

The zero-cross detecting circuit 13 is a circuit for detecting a zero-cross point from a voltage (non-conduction phase voltage) induced in the coils of the respective phases U, V, and W of the brushless motor 1 in a case where the brushless motor 1 is rotating, and information of the detected zero-cross point is transmitted as a zero-cross signal to the control unit 20.

Figure 2:
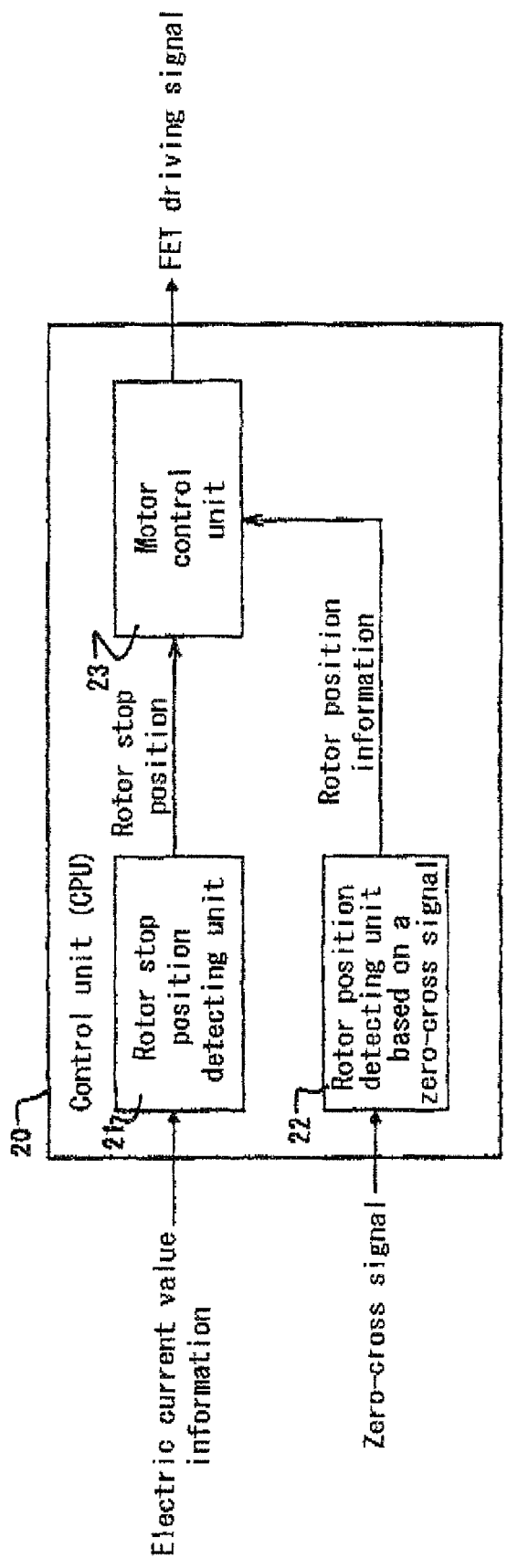
FIG. 2 shows a configuration of a control unit in the brushless motor control system shown in FIG. 1.

FIG. 2 shows a configuration of the control unit 20. This control unit 20 is configured by including hardware such as a CPU (micro computer or micro controller), a ROM, a RAM, an A/D converter, and a D/A converter.

A rotor stop position detecting unit 21 in the control unit 20 receives an electric current signal from the current rise detecting circuit 12, and based on this electric current signal, performs processing for detecting a rotor stop position when the motor is in a stop state. The information of the rotor stop position detected by the rotor stop position detecting unit 21 is transmitted to a motor control unit 23. The method in the rotor stop position detecting unit 21 for detecting a rotor stop position is described later.

A rotor position detecting unit 22 based on a zero-cross signal, receives information of the zero-cross point detected in the zero-cross detecting circuit 13, and based on this zero-cross point information, performs processing for detecting a rotor position in a case where the motor is rotating. The information of the rotor position detected in the rotor position detecting unit 22 based on a zero-cross signal, is transmitted as rotor position information to the motor control unit 23.

In the motor control unit 23, based on the information of the rotor stop position received from the rotor stop position detecting unit 21 and on the rotor position information received from the rotor position detecting unit 22 based on a zero-cross signal, a FET driving signal for driving the switching elements (FET) Q1 to Q6 is generated, to thereby control the voltage for energizing the coils of the respective phases U, V, and W of the brushless motor 1.

The aforementioned current rise detecting circuit in the present invention corresponds to the current rise detecting circuit 12, and the rotor stop position detecting unit corresponds to the rotor stop position detecting unit 21.

[Description of Rotor Stop Position Detecting Control Method Based on Electric Current Patterns]

Here there is described a rotor stop position detecting control method based on electric current patterns when the motor is in a stop state, to be performed by the current rise detecting circuit 12 and the rotor stop position detecting unit 21.

Figure 4:
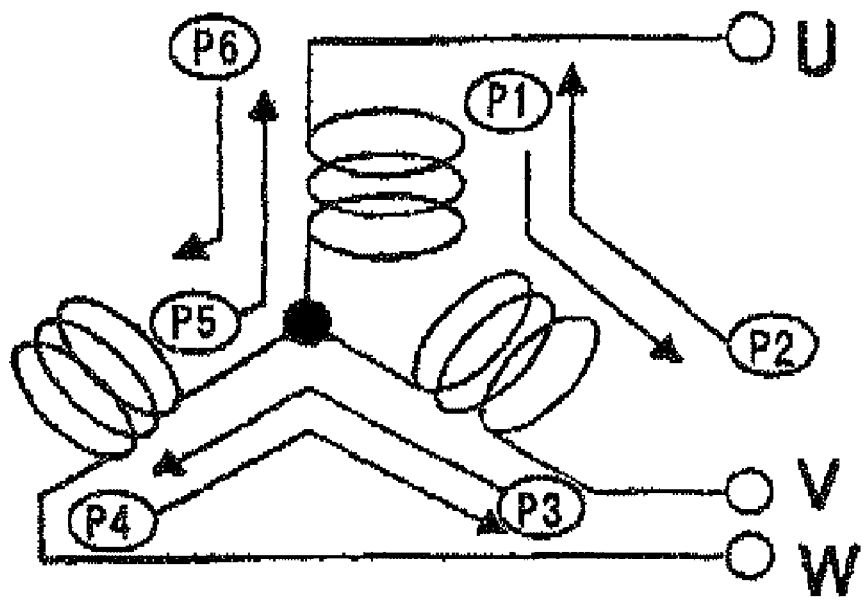
FIG. 4 shows patterns of electric current that is caused to flow to the coils of phases U, V, and W of the brushless motor.

FIG. 4 shows patterns of electric current that is caused to flow to the coils of the phases U, V, and W. In order to detect a rotor stop position based on the electric current patterns, as shown in FIG. 4, in the order shown with the patterns P1 to P6, a direct current voltage is applied to perform conduction only for a short period of time so as not to drive the motor (for example, several msec), and a rotor stop position is detected based on the patterns of the electric current flowing to the coils of the respective phases U, V, and W.

This detection is such that, when an electric current is caused to flow into the coils of the respective phases wound on the stator, under the influence of the magnetic field that occurs on the stator side and the magnetic field associated with the permanent magnet on the rotor side, whether the stator side magnetic field (and consequently electric current) acts in a direction of increasing, or whether the magnetic field acts in a direction of being canceled and reduced, is changed due to the positional relationship between the rotor and stator, and a rotor stop position is thereby detected.

FIG. 5 to FIG. 10 show examples of the rotor stop position detection control method based on electric current patterns. FIG. 5A to FIG. 5C show a rotor stop position detection control method (1) based on electric current patterns. FIG. 5A shows a state where, in a brushless motor with four poles (two pairs of N and S poles) of rotor side permanent magnets and coils of the respective phases U, V, and W wound on the stator side, the rotor side mid-point "a" (boundary point between the N and S poles) matches with the coils axis of the U phase coil. In FIG. 5A, reference symbols "a" to "d" denote mid-points.

Figure 5A:
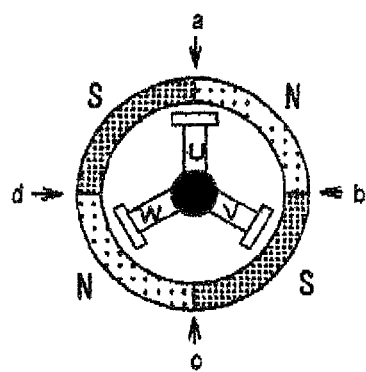
FIG. 5A shows a rotor stop position detection control method (1) based on electric current patterns.
Figure 5B:
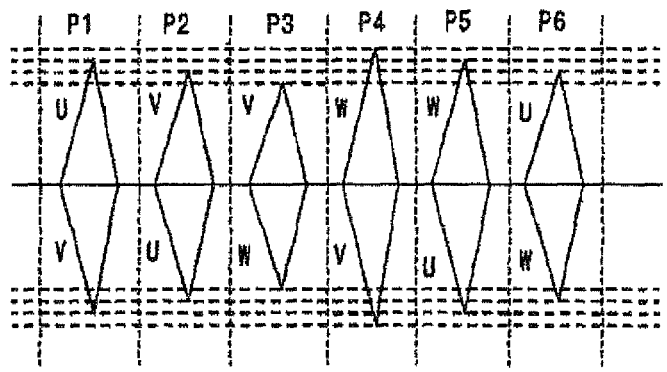
FIG. 5B shows the rotor stop position detection control method (1) based on electric current patterns.
Figure 5C:
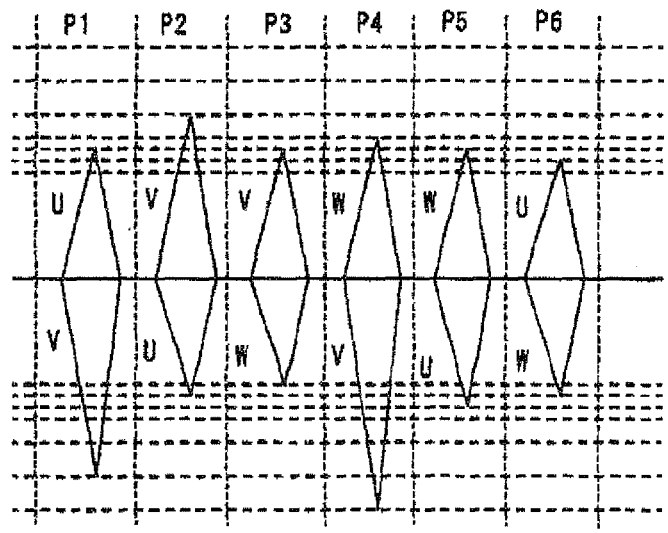
FIG. 5C shows the rotor stop position detection control method (1) based on electric current patterns.

In the state of the rotor stop position shown in FIG. 5A, if an electric current flows in the patterns of P1 to P6, the electric current patterns shown in FIG. 5B and FIG. 5C are obtained. FIG. 5B shows electric current patterns in a ease where a conventional brushless motor (brushless motor having no V phase coil removed) is used. FIG. 5C shows electric current patterns in a case where the brushless motor of the present invention (brushless motor having a V phase coil removed) is used.

In the case of the conventional brushless motor shown in FIG. 5B, the highest level of the electric current flows in the pattern P4 (where a voltage is applied between the phases W and V so that the W phase has a positive potential), and the lowest level of the electric current flows in the pattern P3 (where a voltage is applied between the phases V and W so that the V phase has a positive potential).

In this manner, based on the patterns P1 to P6 of the electric current flowing to the coils of the respective phases U, V, and W, the rotor stop position is determined to be in the state of FIG. 5A. Therefore, there is a possibility that a false determination may be made in a case where there is an error in the L (inductance) of the coils of the respective phases U, V, and W.

FIG. 5C is a case of using the brushless motor according to the present invention. It can be understood that, as shown in the patterns P1, P2, P3, and P4, the electric current flowing to the V phase significantly differs from the electric current flowing to the other phases. The method for determining the rotor stop position is described later.

Figure 6A:
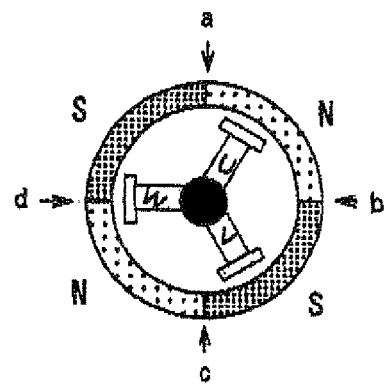
FIG. 6A shows a rotor stop position detection control method (2) based on electric current patterns.
Figure 6B:
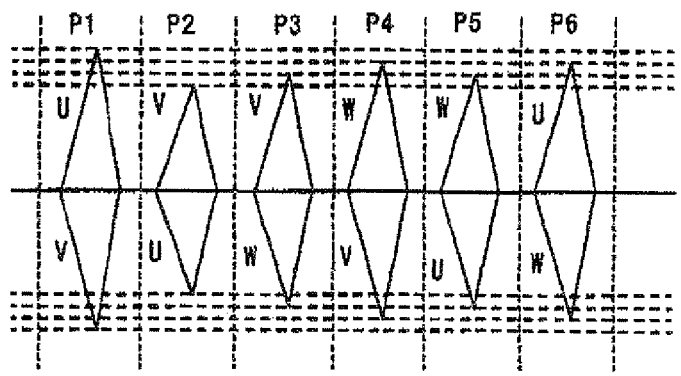
FIG. 6B shows the rotor stop position detection control method (2) based on electric current patterns.
Figure 6C:
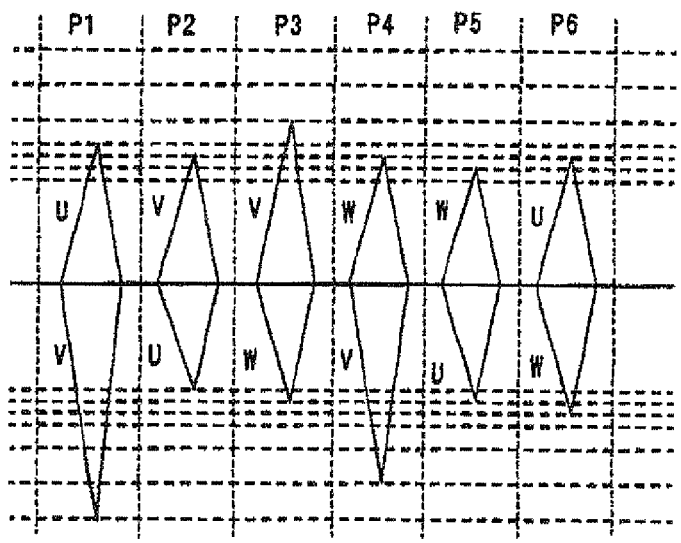
FIG. 6C shows the rotor stop position detection control method (2) based on electric current patterns.

FIG. 6A to FIG. 6C show a rotor stop position detection control method (2) based on electric current patterns. FIG. 6A shows a state where the rotor side mid-point "d" (boundary point between N and S poles) matches with the coil axis of the W phase coil. In FIG. 6A, reference symbols "a" to "d" denote mid-points.

In the state of the rotor stop position shown in FIG. 6A, if an electric current flows in the patterns of P1 to P6, the electric current patterns shown in FIG. 6B and FIG. 6C are obtained. FIG. 63 shows electric current patterns in a case where a conventional brushless motor (brushless motor having no V phase coil removed) is used. FIG. 6C shows electric current patterns in a case where the brushless motor according to the present invention (brushless motor having a V phase coil removed) is used.

In the case of the conventional brushless motor shown in FIG. 6B, the highest level of the electric current flows in the pattern P1 (where a voltage is applied between the phases U and V so that the U phase has a positive potential), and the lowest level of the electric current flows in the pattern P2 (where a voltage is applied between the phases U and V so that the V phase has a positive potential).

In this manner, based on the patterns P1 to P6 of the electric current flowing to the coils of the respective phases U, V, and W, the rotor stop position is determined to be in the state of FIG. 6A. Therefore, there is a possibility that a false determination may be made in a case where there is an error in the L (inductance) of the coils of the respective phases U, V, and W.

FIG. 6C is a case of using the brushless motor according to the present invention. It can be understood that in the patterns P1, P2, P3, and P4, the electric current flowing to the V phase significantly differs from the electric current flowing to the other phases. The method for determining the rotor stop position in the present invention is described later.

Figure 7A:
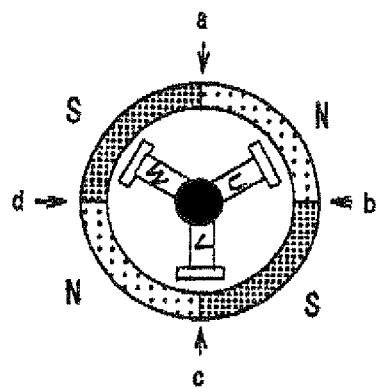
FIG. 7A shows a rotor stop position detection control method (3) based on electric current patterns.
Figure 7B:
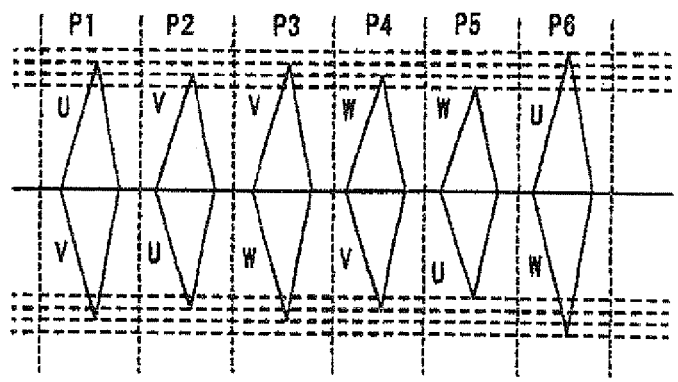
FIG. 7B shows the rotor stop position detection control method (3) based on electric current patterns.
Figure 7C:
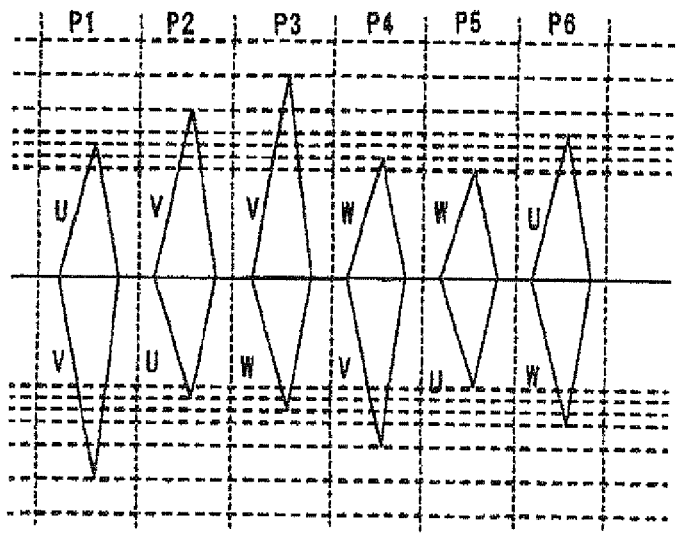
FIG. 7C shows the rotor stop position detection control method (3) based on electric current patterns.

FIG. 7A to FIG. 7C show a rotor stop position detection control method (3) based on electric current patterns. FIG. 7A shows a state where the rotor side mid-point "c" (boundary point between N and S poles) matches with the coil axis of the V phase coil. In FIG. 7A, reference symbols "a" to "d" denote mid-points.

In the state of the rotor stop position shown in FIG. 7A, if an electric current flows in the patterns of P1 to P6, the electric current patterns shown in FIG. 7B and FIG. 7C are obtained. FIG. 7B shows electric current patterns in a case where a conventional brushless motor (brushless motor having no V phase coil removed) is used. FIG. 7C shows electric current patterns in a case where the brushless motor of the present invention (brushless motor having a V phase coil removed) is used.

In the case of the conventional brushless motor shown in FIG. 7B, the highest level of the electric current flows in the pattern P6 (where a voltage is applied between the phases U and W so that the U phase has a positive potential), and the lowest level of the electric current flows in the pattern P5 (where a voltage is applied between the phases U and W so that the W phase has positive potential).

In this manner, based on the patterns P1 to P6 of the electric current flowing to the coils of the respective phases U, V, and W, the rotor stop position is determined to be in the state of FIG. 7A. Therefore, there is a possibility that a false determination may be made in a case where there is an error in the L (inductance) of the coils of the respective phases U, V, and W.

FIG. 7C is a case of using the brushless motor according to the present invention. It can be understood that in the patterns P2 and P3, the electric current flowing to the V phase significantly differs from the electric current flowing to the other phases. The method for determining the rotor stop position in the present invention is described later.

Figure 8A:
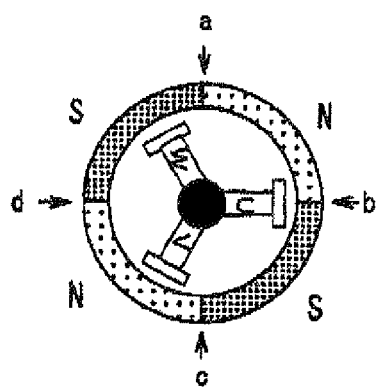
FIG. 8A shows a rotor stop position detection control method (4) based on electric current patterns.
Figure 8B:
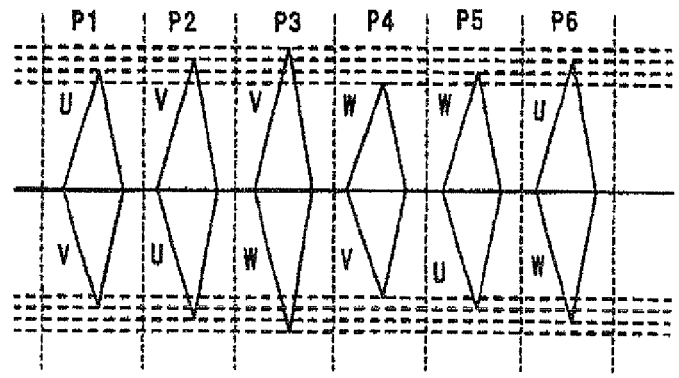
FIG. 8B shows the rotor stop position detection control method (4) based on electric current patterns.
Figure 8C:
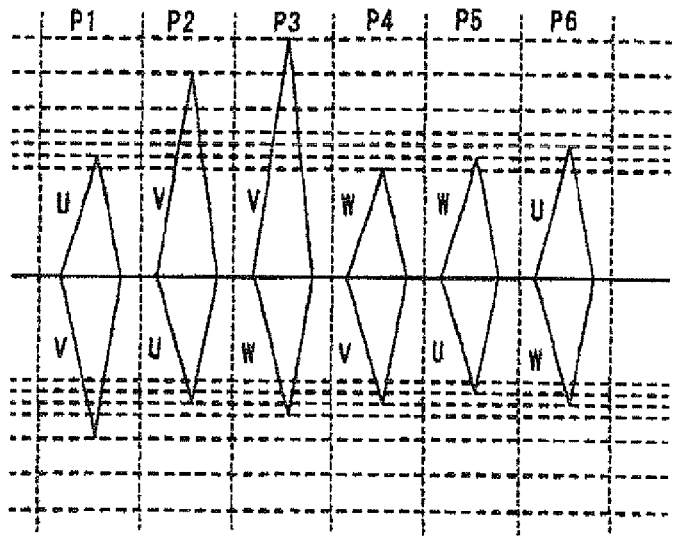
FIG. 8C shows the rotor stop position detection control method (4) based on electric current patterns.

FIG. 8A to FIG. 8C show a rotor stop position detection control method (4) based on electric current patterns. FIG. 8A shows a state where the rotor side mid-point "b" (boundary point between N and S poles) matches with the coil axis of the U phase coil. In FIG. 8A, reference symbols "a" to "d" denote mid-points.

In the state of the rotor stop position shown in FIG. 8A, if an electric current flows in the patterns of P1 to P6, the electric current patterns shown in FIG. 8B and FIG. 8C are obtained. FIG. 8B shows electric current patterns in a case where a conventional brushless motor (brushless motor having no V phase coil removed) is used. FIG. 8C shows electric current patterns in a case where the brushless motor according to the present invention (brushless motor having a V phase coil removed) is used.

In the case of the conventional brushless motor shown in FIG. 8B, the highest level of the electric current flows in the pattern P3 (where a voltage is applied between the phases V and W so that the V phase has a positive potential), and the lowest level of the electric current flows in the pattern P4 (where a voltage is applied between the phases V and W so that the W phase has positive potential).

In this manner, based on the patterns P1 to P6 of the electric current flowing to the coils of the respective phases U, V, and W, the rotor stop position is determined to be in the state of FIG. 8A. Therefore, there is a possibility that a false determination may be made in a case where there is an error in the L (inductance) of the coils of the respective phases U, V, and W.

FIG. 8C is a case of using the brushless motor according to the present invention. It can be understood that in the patterns P1, P2, P3, and P4, the electric current flowing to the V phase significantly differs from the electric current flowing to the other phases. The method for determining the rotor stop position in the present invention is described later.

Figure 9A:
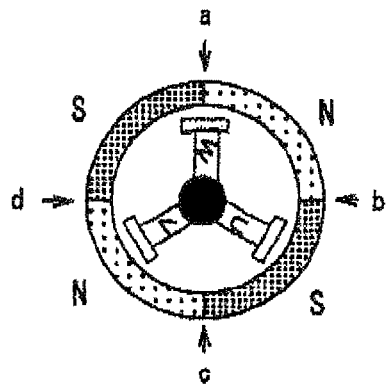
FIG. 9A shows a rotor stop position detection control method (5) based on electric current patterns.
Figure 9B:
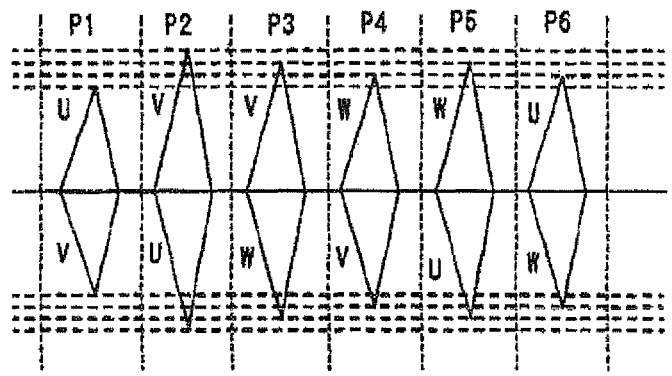
FIG. 9B shows the rotor stop position detection control method (5) based on electric current patterns.
Figure 9C:
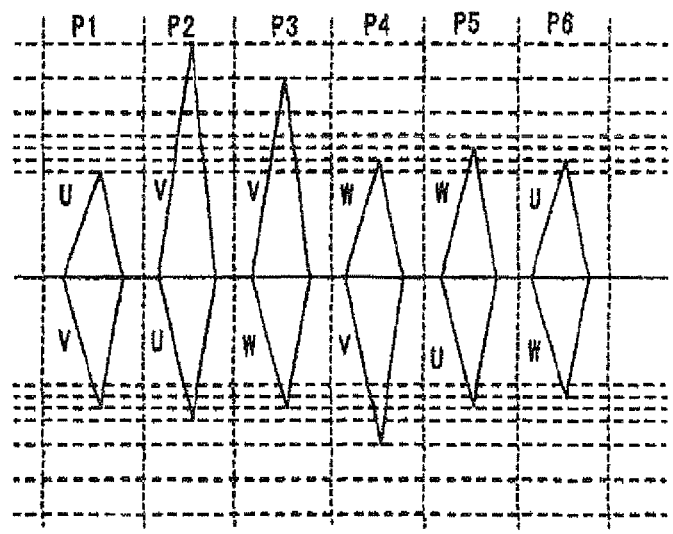
FIG. 9C shows the rotor stop position detection control method (5) based on electric current patterns.

FIG. 9A to FIG. 9C show a rotor stop position detection control method (5) based on electric current patterns. There is shown a state where the rotor side mid-point "a" (boundary point between N and S poles) matches with the coil axis of the W phase coil. In FIG. 9A, reference symbols "a" to "d" denote mid-points.

In the state of the rotor stop position shown in FIG. 9A, if an electric current flows in the patterns of P1 to P6, the electric current patterns shown in FIG. 9B and FIG. 9C are obtained. FIG. 9B shows electric current patterns in a case where a conventional brushless motor (brushless motor having no V phase coil removed) is used. FIG. 9C shows electric current patterns in a case where the brushless motor according to the present invention (brushless motor having a V phase coil removed) is used.

In the case of the conventional brushless motor shown in FIG. 9B, the highest level of the electric current flows in the pattern P2 (where a voltage is applied between the phases V and U so that the V phase has a positive potential), and the lowest level of the electric current flows in the pattern P1 (where a voltage is applied between the phases V and U so that the V phase has positive potential).

In this manner, based on the patterns P1 to P6 of the electric current flowing to the coils of the respective phases U, V, and W, the rotor stop position is determined to be in the state of FIG. 9A. Therefore, there is a possibility that a false determination may be made in a case where there is an error in the L (inductance) of the coils of the respective phases U, V, and W.

FIG. 9C is a case of using the brushless motor according to the present invention. It can be understood that in the patterns P1, P2, P3, and P4, the electric current flowing to the V phase significantly differs from the electric current applied to the other phases. The method for determining the rotor stop position in the present invention is described later.

Figure 10A:
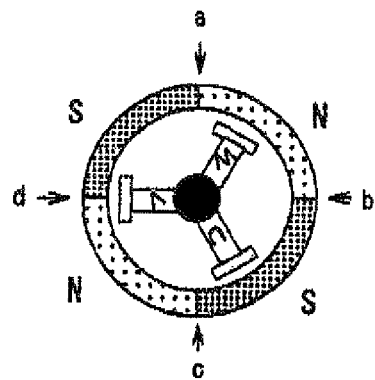
FIG. 10A shows a rotor stop position detection control method (6) based on electric current patterns.
Figure 10B:
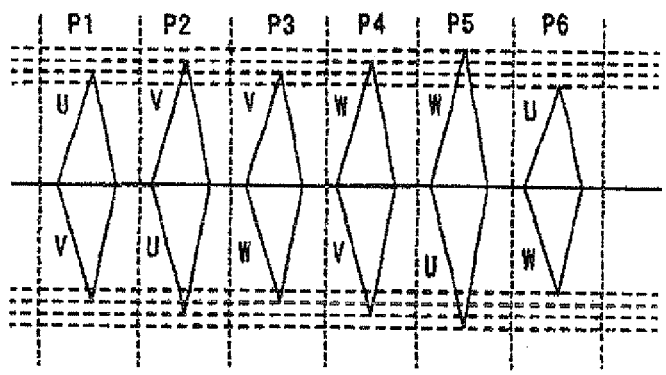
FIG. 10B shows the rotor stop position detection control method (6) based on electric current patterns.
Figure 10C:
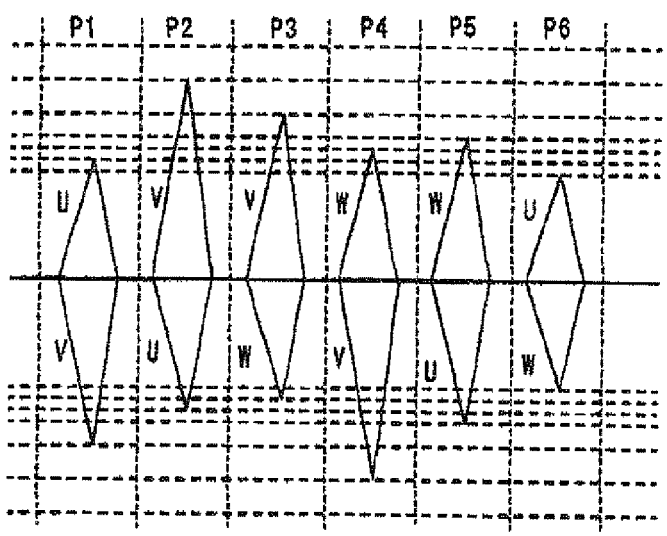
FIG. 10C shows the rotor stop position detection control method (6) based on electric current patterns.

FIG. 10A to FIG. 10C show a rotor stop position detection control method (6) based on electric current patterns. There is shown a state where the rotor side mid-point "d" (boundary point between N and S poles) matches with the coil axis of the V phase coil. In FIG. 10A, reference symbols "a" to "d" denote mid-points.

In the state of the rotor stop position shown in FIG. 10A, if an electric current flows in the patterns of P1 to P6, the electric current patterns shown in FIG. 10B and FIG. 10C are obtained. FIG. 10B shows electric current patterns in a case where a conventional brushless motor (brushless motor having no V phase coil removed) is used. FIG. 10C shows electric current patterns in a case where the brushless motor according to the present invention (brushless motor having a V phase coil removed) is used.

In the case of the conventional brushless motor shown in FIG. 10B, the highest level of the electric current flows in the pattern P5 (where a voltage is applied between the phases W and U so that the W phase has a positive potential), and the lowest level of the electric current flows in the pattern. P6 (where a voltage is applied between the phases W and U so that the U phase has positive potential). In this manner, with the patterns P1 to P6 of the electric current flowing to the coils of the respective phases U, V, and W, the rotor stop position is determined to be in the state of FIG. 10A. Therefore, there is a possibility that a false determination may be made in a case where there is an error in the L (inductance) of the coils of the respective phases U, V, and W.

FIG. 10C is a ease of using the brushless motor according to the present invention. It can be understood that in the patterns P1, P2, P3, and P4, the electric current flowing to the V phase significantly differs from the electric current applied to the other phases. The method for determining the rotor stop position in the present invention is described later.

[Description of Rotor Stop Position Detection Method Based on Electric Current Pattern Difference Detection Method]

Next, there is described a rotor stop position detection method based on the differences in the electric current patterns shown in FIG. 5 to FIG. 10.

Figure 11A:
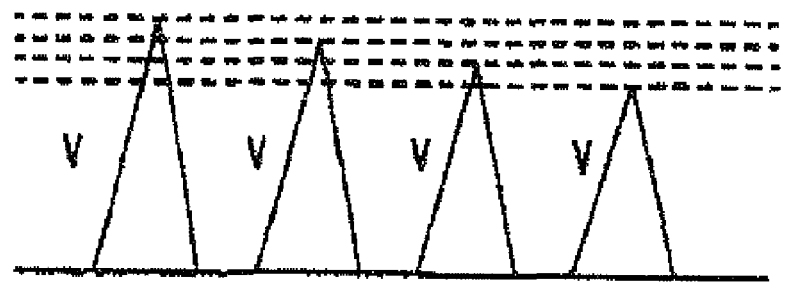
FIG. 11A shows an electric current pattern difference detection method (1).
Figure 11B:
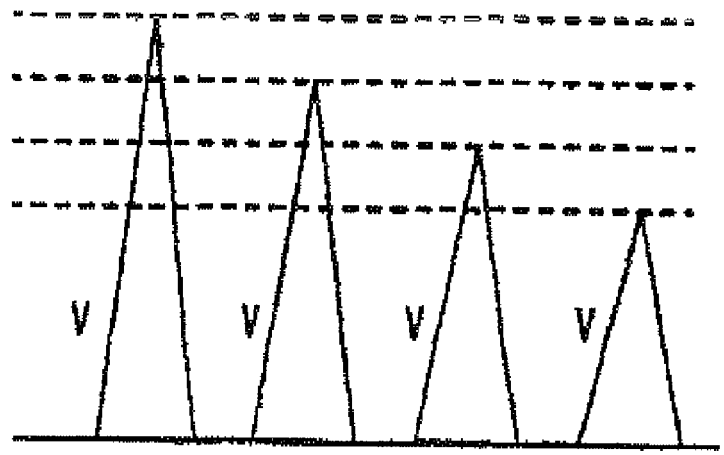
FIG. 11B shows the electric current pattern difference detection method (1).

FIG. 11A and FIG. 11B illustrate an electric current pattern difference detection method (1). It can be understood from the patterns of FIG. 5 to FIG. 10, that in the conventional case where no V phase L (coil) is removed, there are four types as shown in FIG. 11A. Therefore, when comparing the size of the respective waveforms, there is a possibility that due to variations in the L values, the differences may become small so that size comparison becomes impossible, and the size relationship may be reversed.

In the case according to the present invention where the V phase L (coil) is removed, it can be understood from the patterns of FIG. 5 to FIG. 10, that there are four types as shown in FIG. 11B. Therefore, the electric current differences in the electric current values of the V phase are significant even with errors in the L values. Consequently it is easy to compare sizes, and the size relationship will not be reversed. Thus it is possible to identify the four types of the electric current of the V phase without making a false determination.

Figures 12A, 12B:
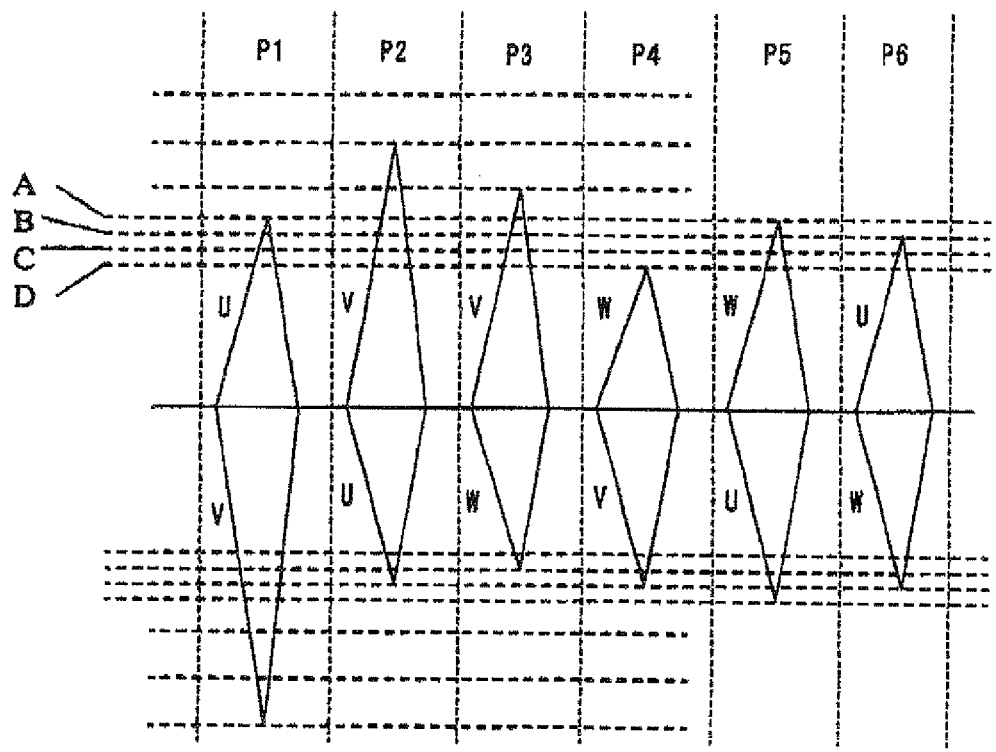
FIG. 12A shows an electric current pattern difference detection method (2).
FIG. 12B shows the electric current pattern difference detection method (2).

As shown in the electric current pattern difference detection method (2) in FIG. 12A and FIG. 12B, for the patterns P1 to P4, it is possible to identify four types between "electric current is likely to flow" and "electric current is unlikely to flow", depending on the electric current of the V phase. For the patterns P5 and P6, since there is no V phase electric current, it is necessary to employ another method.

For the W phase of the pattern P5, a size comparison is made with the W phase waveform of the pattern P4. Regarding the W phase waveform of the pattern P4, it is known which of the four types of electric current this is for. Moreover since it has a waveform of the same phase, there is no problem in the variation of L values (because only the electric current difference due to the influence of the magnetic field appears as a difference).

The electric current patterns of the W phase based on the rotor position exist for six patterns of rotor positions 1 to 6 (shown in FIG. 5 to FIG. 10). The combinations of the waveforms of the W phase patterns P4 and P5 are as shown in the table of FIG. 12B. In this case, the W phase electric current values A, B, C, and D of the pattern P4 can be identified from the waveform (electric current value) of the V phase.

In the table shown in FIG. 12B, there is only one pattern type in which the W phase electric current value of the pattern P4 is A or D. Therefore it is possible, without calculation, to identify the W phase electric current value of the pattern P5.

In the case of the rotor position 2 (FIG. 5A) and the rotor position 6 (FIG. 10A), the W phase electric current of the pattern P5 is either C or A. For errors in the L values, the difference in the electric current values is not significant enough to reverse "C←→A". Therefore, the sizes are simply compared, and the greater one is taken as the electric current value of A and the smaller one is taken as the electric current value of C. Also in the case of the rotor position 3 (FIG. 7A) and the rotor stop position 5 (FIG. 9A), a size comparison is made as with the above case, and the greater one is taken as the electric current value of B, and the smaller one is taken as the electric current value of D.

For the U phase electric current waveform of the pattern P6, a size comparison is made with the U phase electric current waveform of the pattern P1. Regarding the U phase waveform of the pattern P1, it is known which of the four types of electric current this is for. Moreover since it has a waveform of the same phase, there is no problem in the variation of L values (because only the electric current difference due to the influence of magnetic field appears as a difference).

Figures 13A, 13B:
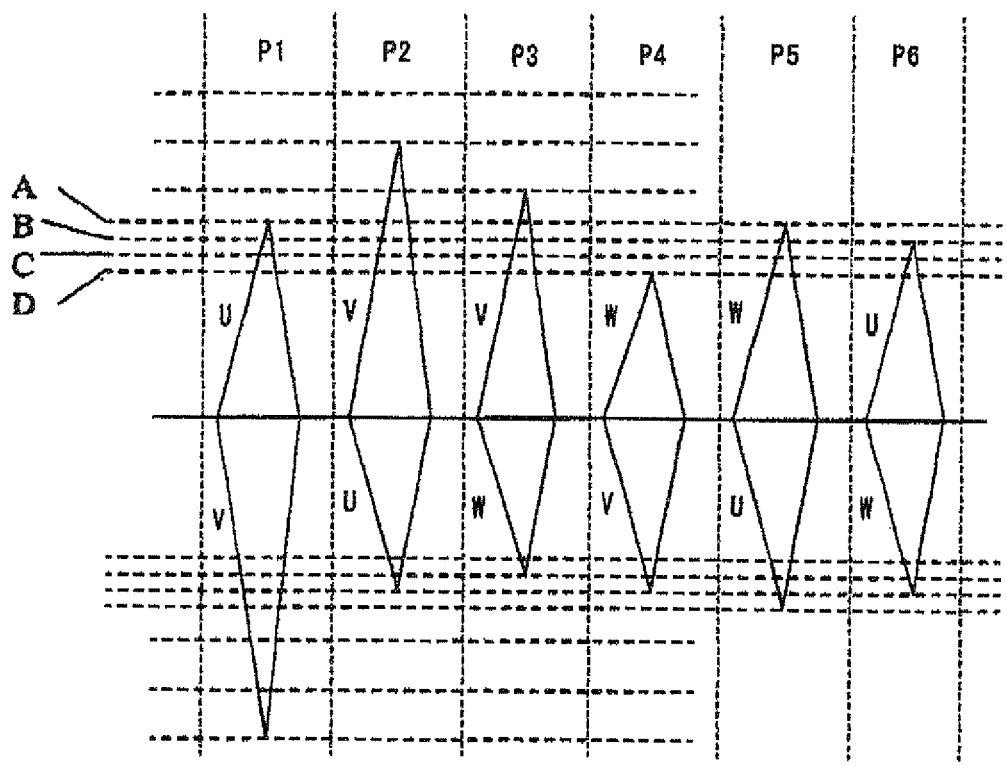
FIG. 13A shows an electric current pattern difference detection method (3).
FIG. 13B shows the electric current pattern, difference detection method (3).

The electric current patterns based on the rotor position exist for six patterns of the aforementioned rotor position 1 (FIG. 5A) to rotor position 6 (FIG. 10C). The combinations of the waveforms of the pattern P1 and the pattern P6 of the W phase, are as shown in FIG. 13B. In this case, U phase electric current values A, B, C, and D of the pattern P1 can be identified from the waveform (electric current value) of the V phase.

As shown in the table of FIG. 13B, there is only one pattern type in which the U phase electric current value of the pattern P1 is A or D. Therefore it is possible, without calculation, to identify the U phase electric current value of the pattern P6.

In the case of the rotor position 1 (FIG. 5A) and the rotor position 3 (FIG. 7A), the W phase electric current of the pattern P6 is either C or A. For errors in the L, the difference in the electric current values is not significant enough to reverse "C←→A". Therefore, the sizes are simply compared, and the greater one is taken as the electric current value of A and the smaller one is taken as the electric current value of C. Also in the case of the rotor position 4 (FIG. 8A) and the rotor position 6 (FIG. 10A), a size comparison is made as with the above case, and the greater one is taken as the electric current value of B, and the smaller one is taken as the electric current value of D.

Based on the determination method described above, it is possible to know all of the "conduction phase in which electric current is likely to flow" to "conduction phase in which electric current is unlikely to flow", in the rotor positions (FIG. 5A to FIG. 10C) of the above six patterns. Thus, it is possible to determine the rotor stop position.

[Description of Rotor Position Detection Method when Motor is Rotating]

A rotor position detection method in a case where the motor is rotating is described. This method is not relevant to the present invention. Moreover since it is a general method, it is only briefly described hereunder.

Figure 14:
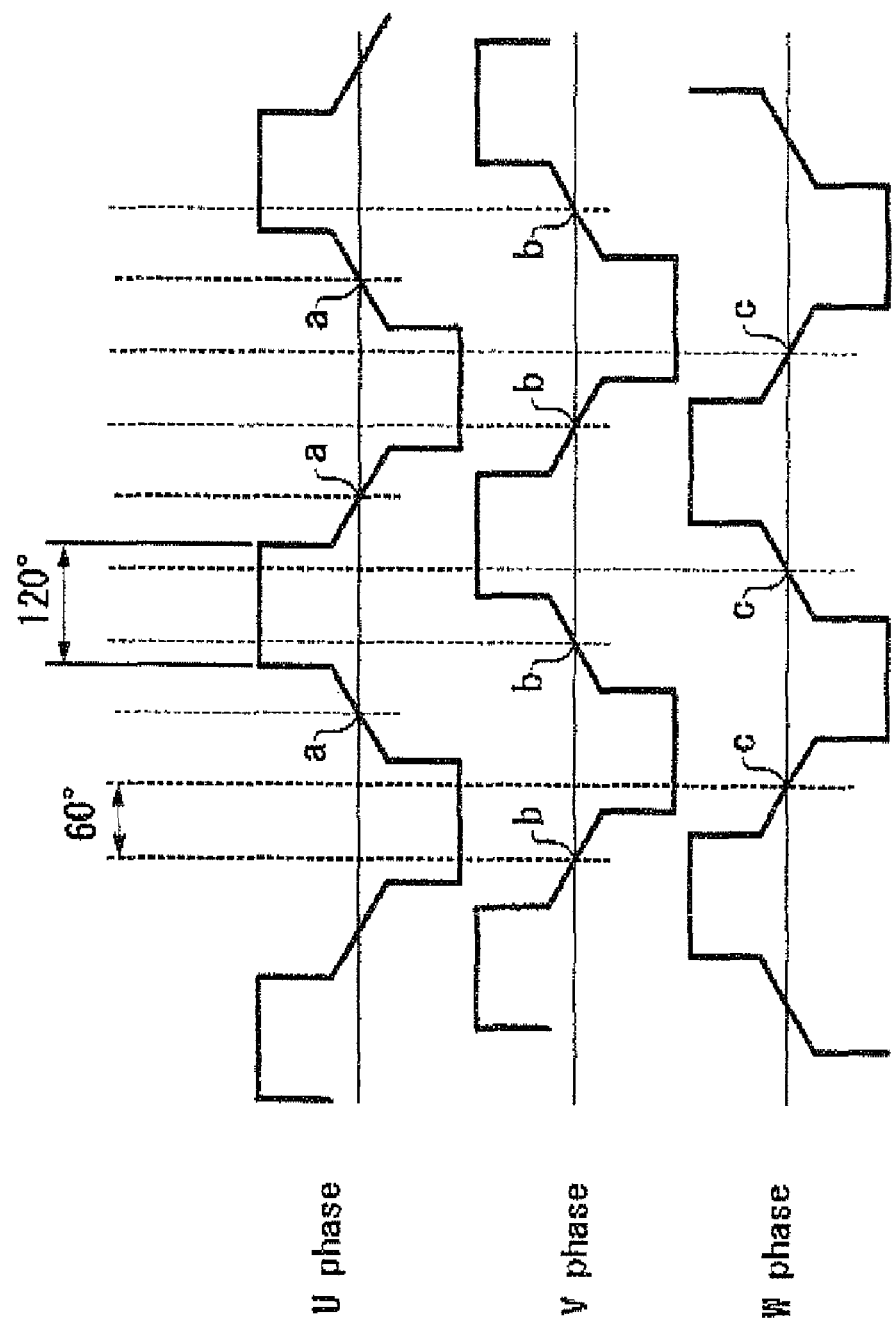
FIG. 14 shows phase voltage waveforms of U, V, and W phases in a 120° conduction method.

When the motor is rotating, the motor is driven based on the 120° conduction method. In this 120° conduction method, as shown in the phase voltage waveforms of U, V, and W in FIG. 14, electric power is conducted only during the period of 120° of the entire power conduction period of 180°. Therefore, a non-conduction phase occurs in the respective phases of U, V, and W, and it is possible to detect the rotor position by detecting the zero-cross points "a", "b", and "c" of this non-conduction phase.

As described above, according to the present invention, in the brushless motor it is possible to reliably detect a rotor stop position when the motor is in a stop state, without implementing a Hall element in the respective phases U, V, and W, or implementing a magnet or the like for position detection separately from the rotor. Therefore, it is possible to supply an inexpensive brushless motor control system. Moreover, the number of components of a sensorless motor (brushless motor) can be reduced while reducing the size and weight thereof.

The embodiment of the present invention has been described above. However, the brushless motor and the brushless motor control system of the present invention are not limited to the aforementioned illustrative examples, and various modifications may be made without departing from the scope of the present invention.

INDUSTRIAL APPLICABILITY

The present invention may be applied to a brushless motor, a brushless motor control system, and a brushless motor control method. According to this brushless motor, brushless motor control system, and brushless motor control method, in the brushless motor, it is possible to reliably detect a rotor stop position even when there is a variation in the inductance values of the driving coils of multiple phases, without implementing a Hall element in the respective phases U, V, and W, or implementing a magnet or the like for position detection separately from the rotor.

The invention claimed is:

1. A brushless motor control system that drives a brushless motor used as a starter motor of an engine, the motor control system detecting a rotor stop position when activating the brushless motor which includes a stator having coils of three phases U, V, and W, and controlling a phase voltage for energizing the coils of the respective phases U, V, and W,
wherein the brushless motor includes the stator having coils of phases U, V, and W of N (N≧2) poles, in which any one phase coil among the coils of the phases U, V, and W is removed in one of the N poles, and
wherein the brushless motor control system comprises:
a current rise detecting circuit that, when the brushless motor is in a stop state, sequentially selects coils of two phases from the coils of the respective phases U, V, and W, applies a predetermined direct current voltage between the selected coils of the two phases, and detects a value of an electric current flowing to the selected coils of the two phases; and
a rotor stop position detecting unit that determines a rotor stop position of the brushless motor based on information of the value of the electric current flowing to the respective phase coils which is detected by the current rise detecting circuit.

2. The brushless motor control system according to claim 1,
wherein the brushless motor includes a four pole rotor including two pairs of an N pole and S pole; and
wherein the current rise detecting circuit applies, at six predetermined timings from a first timing to a sixth timing, a predetermined direct current voltage between phases U and V, V and U, V and W, W and V, W and U, and U and W of the coils of the respective phases U, V, and W of the stator, in this order, and detects an electric current pattern including a value of an electric current flowing to the coils of the respective phases at the respective timings from the first timing to the sixth timing; and
the rotor stop position detecting unit determines the rotor stop position by detecting a difference in the electric current pattern including the value of the electric current at the respective timings from the first timing to the sixth timing.

3. The brushless motor control system according to claim 2,
wherein the removal phase is the V phase, and
wherein the rotor stop position detecting unit, when detecting a difference in the electric current patterns, uses:
a value of a V phase electric current flowing to the coil of the V phase at the first to fourth timings;
a value of a W phase electric current flowing to the coil of the W phase at the fifth timing; and
a value of a U phase electric current flowing to the coil of the U phase at the sixth timing.

4. A brushless motor control method for a brushless motor control system that drives a brushless motor used as a starter motor of an engine, the motor control system detecting a rotor stop position when activating the brushless motor which includes a stator having coils of three phases U, V, and W, and controlling a phase voltage for energizing the coils of the respective phases U, V, and W, the method comprising:
a step of using the brushless motor including the stator having coils of phases U, V, and W of N (N≧2) poles, in which any one phase coil among the coils of the phases U, V, and W is removed in one of the N poles;
a current rise detection step of, when the brushless motor is in a stop state, sequentially selecting coils of two phases from the coils of the respective phases U, V, and W, applying a predetermined direct current voltage between the selected coils of the two phases, and detecting a value of an electric current flowing to the selected coils of the two phases; and
a rotor stop position detection step of determining a rotor stop position of the brushless motor based on information of the value of the electric current flowing to the respective phase coils detected in the current rise detection step.

* * * * *